(12) United States Patent
Phillips et al.

(10) Patent No.: US 10,885,507 B1
(45) Date of Patent: Jan. 5, 2021

(54) TRANSFERRING A CUSTOMER FROM AN ATM TRANSACTION TO A DEVICE-BASED TRANSACTION DURING AN ERROR STATE, AND APPLICATIONS THEREOF

(71) Applicant: Capital One Services, LLC, McLean, VA (US)

(72) Inventors: Jeremy J. Phillips, Brooklyn, NY (US); Christopher Schott, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/705,626

(22) Filed: Dec. 6, 2019

(51) Int. Cl.
  *G06Q 40/00* (2012.01)
  *G06Q 20/32* (2012.01)
  *G06Q 20/10* (2012.01)
  *G06F 11/07* (2006.01)

(52) U.S. Cl.
  CPC ..... *G06Q 20/3223* (2013.01); *G06F 11/0709* (2013.01); *G06F 11/0793* (2013.01); *G06Q 20/1085* (2013.01); *G06Q 20/3276* (2013.01); *G06Q 40/00* (2013.01)

(58) Field of Classification Search
  CPC .................................................. G06Q 40/00
  See application file for complete search history.

(56) References Cited

U.S. PATENT DOCUMENTS

| 5,220,501 | A  | * | 6/1993 | Lawlor ............... | G06Q 40/02 705/40 |
| 7,100,195 | B1 | * | 8/2006 | Underwood ........... | G06F 9/451 726/3 |
| 9,640,040 | B2 |   | 5/2017 | Irudayam et al. | |
| 10,083,483 | B2 | * | 9/2018 | Bhakta .................. | G06Q 40/02 |
| 2015/0088758 | A1 |   | 3/2015 | Varadarajan et al. | |
| 2017/0046217 | A1 | * | 2/2017 | Shinde ................ | G06F 11/0715 |
| 2017/0262823 | A1 |   | 9/2017 | Hartung | |
| 2019/0073663 | A1 |   | 3/2019 | Jamkhedkar et al. | |

OTHER PUBLICATIONS

Antonella et al.; Introducing ATMs in India: a contexual inquiry; Nov. 3, 2003; Elsevier, web, 30-39 (Year: 2003).*
Jacob, M., et al., QR based Card-less ATM Transactions, Journal for Research vol. 2 Issue No. 2; ISSN:2395-7549; Apr. 2016.

* cited by examiner

*Primary Examiner* — I Jung Liu
(74) *Attorney, Agent, or Firm* — Sterne, Kessler, Goldstein & Fox P.L.L.C.

(57) ABSTRACT

A system and method of operating a computing system including: detecting, based on a log file of an automated teller machine (ATM), an error event; identifying a customer associated with the error event based on the log file; accessing, from a customer identification database, a customer profile associated with the customer; authenticating the customer on a mobile application, based on the customer profile; and initiating a mobile transaction session based on authenticating the customer, wherein the customer can complete a transaction with the ATM via the mobile application during the mobile transaction session.

27 Claims, 6 Drawing Sheets

US 10,885,507 B1

TRANSFERRING A CUSTOMER FROM AN ATM TRANSACTION TO A DEVICE-BASED TRANSACTION DURING AN ERROR STATE, AND APPLICATIONS THEREOF

TECHNICAL FIELD

Embodiments relate to automated teller machines (ATMs).

BACKGROUND

ATMs can fail in a variety of ways. ATMs should be able to fail gracefully when an error occurs and is detected. After an error occurs that reduces the ATM's functionality, the ATM may enter an error state. Failures that cause ATMs to go into an error state include errors when debit cards are captured, mechanical failures of the ATM, and software errors of the ATM.

Under current technologies, when an ATM enters an error state, ATMs typically do not allow a customer to continue a transaction despite the error state. Generally, any transaction that is in progress when the failure occurs must be cancelled. This is inefficient and undesirable for a customer.

Thus, there is a need for more resilient ATM transactions.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the invention.

DETAILED DESCRIPTION

Figure 1:
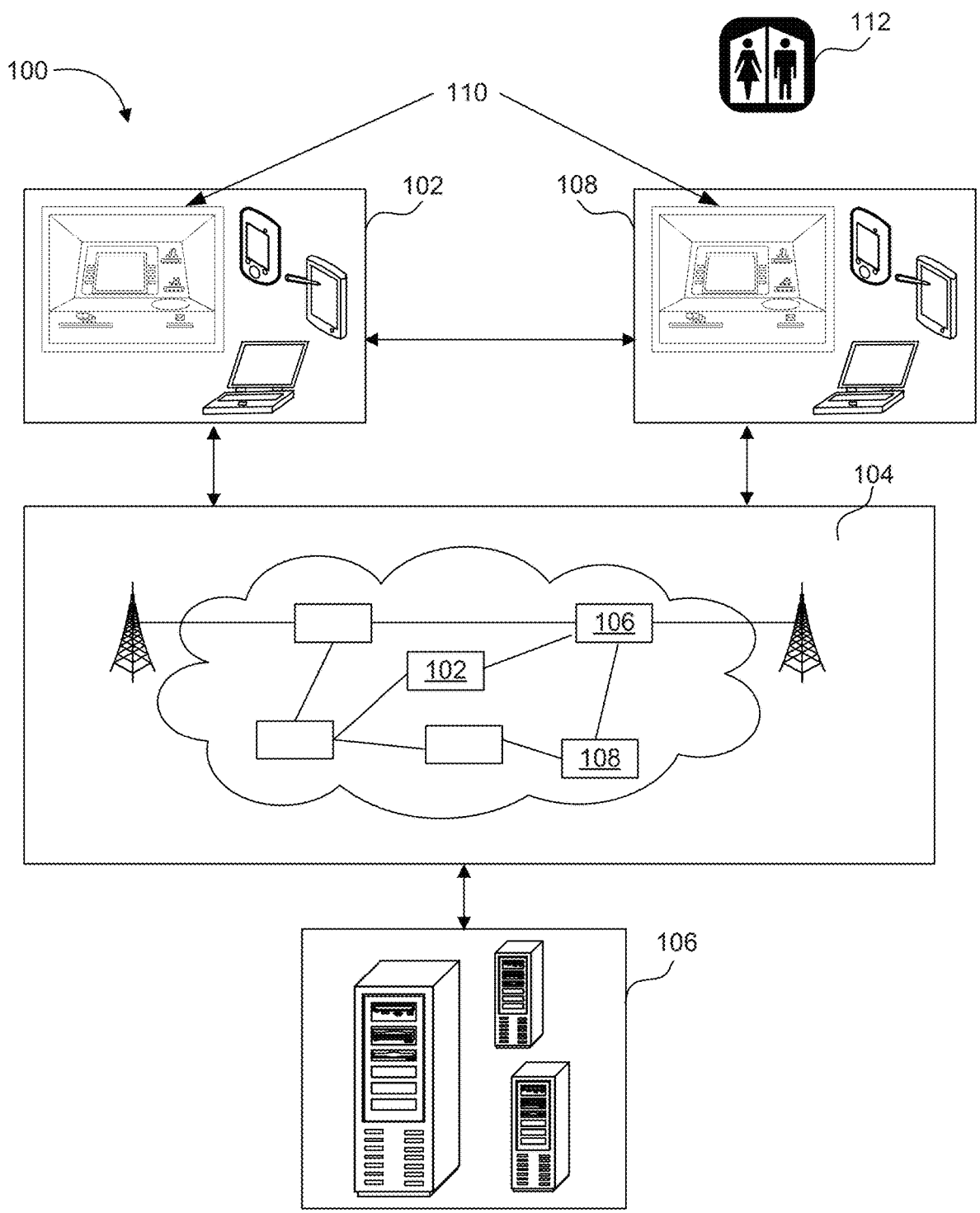
FIG. 1 is a computing system for transferring a customer from an ATM transaction to a device based transaction in an embodiment of the present invention.

Embodiments disclosed herein provide a way to make ATM transactions more resilient by transferring a user to a mobile device when an error occurs. In an embodiment, an error is detected in a log file of an ATM. When the error is detected, a customer associated with the error event is identified based on the log file. A profile associated with the customer is retrieved from a database. Based on the profile, the customer is authenticated on a mobile application. When the customer is authenticated, a mobile transaction session is initiated that enables the customer to complete a transaction with the mobile application or with the ATM via the mobile application.

In this way, embodiments make the ATM transactions more resilient and more tolerant of failures. This can also improve efficiency of the overall distributed system by obviating the need for a customer to restart a transaction at a different ATM, thereby using processing and memory resources more efficiently.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the invention can be operated in any orientation.

The term "module" or "unit" referred to herein can include software, hardware, or a combination thereof in an embodiment of the present invention in accordance with the context in which the term is used. For example, the software can be machine code, firmware, embedded code, or application software. Also for example, the hardware can be circuitry, a processor, a special purpose computer, an integrated circuit, integrated circuit cores, a pressure sensor, an inertial sensor, a microelectromechanical system (MEMS), passive devices, or a combination thereof. Further, if a module or unit is written in the system or apparatus claims section below, the module or unit is deemed to include hardware circuitry for the purposes and the scope of the system or apparatus claims.

The term "service" or "services" referred to herein can include one or more modules or units. A collection of modules or units can be arranged, for example, in software or hardware libraries or development kits in an embodiment of the present invention in accordance with the context in which the term is used. For example, the software or hardware libraries and development kits can be a suite of data and programming code, for example pre-written code, classes, routines, procedures, scripts, configuration data, or a combination thereof, that can be called directly or through an application programming interface (API) to facilitate the execution of functions of the system.

The modules, units, and services in the following description of the embodiments can be coupled to one another as described or as shown. The coupling can be direct or indirect, without or with intervening items between coupled modules, units, or services. The coupling can be by physical contact or by communication between modules, units, or services.

Referring now to FIG. 1, therein is shown a computing system 100 for transferring a customer 112 from an ATM transaction to a device based transaction in an embodiment of the present invention. The customer 112 may be a client of a bank. The computing system 100 includes a first device 102, such as a client device or a server, connected to a second device 106, such as a client device or server. The first device 102 can be further connected to a third device 108, such as a client device or a server. The second device 106 can be further connected to the third device 108. The first device 102, the second device 106, and the third device 108 can communicate with each other through a communication path 104, such as a wireless or wired network.

For example, the first device 102 and the third device 108 can be of any of a variety of devices, such as a mobile device, a smart phone, a cellular phone, a personal digital assistant, a tablet computer, a notebook computer, a laptop computer, a desktop computer, or a kiosk such as an ATM 110. The first device 102 and the third device 108 can be associated with the customer 112. The first device 102 and the third device 108 can couple, either directly or indirectly, to the communication path 104 to communicate with the second device 106 or can be stand-alone devices.

The second device 106 can be any of a variety of centralized or decentralized computing devices. For example, the second device 106 can be a laptop computer, a desktop computer, grid-computing resources, a virtualized computing resource, cloud computing resources, routers, switches, peer-to-peer distributed computing devices, a server, or a combination thereof. The second device 106 can be centralized in a single room, distributed across different rooms, distributed across different geographical locations, or embedded within a telecommunications network. The second device 106 can couple with the communication path 104 to communicate with the first device 102, the third device 108, or a combination thereof. In one embodiment, the second device 106 can be associated with a bank. For example, the second device 106 can be the computing infrastructure or backend computing infrastructure, including server infrastructure of the bank.

For illustrative purposes, the computing system 100 is shown with the first device 102 and the third device 108 as client devices, although it is understood that the computing system 100 can have the first device 102 or the third device 108 as a different type of device. For example, the first device 102 or the third device 108 can be a server. Also for illustrative purposes, the computing system 100 is shown with the second device 106 as a server, although it is understood that the computing system 100 can have the second device 106 as a different type of device. For example, the second device 106 can be a client device.

For brevity of description in the embodiments discussed below, the first device 102 and the third device 108 will be described as client devices and the second device 106 will be described as a server. The embodiments of the present invention, however, are not limited to this selection for the type of devices. The selection is an example of an embodiment of the present invention.

Also for illustrative purposes, the computing system 100 is shown with the first device 102, the second device 106, and the third device 108 as end points of the communication path 104, although it is understood that the computing system 100 can have a different partition between the first device 102, the second device 106, the third device 108, and the communication path 104. For example, the first device 102, the second device 106, the third device 108, or a combination thereof can also function as part of the communication path 104.

The communication path 104 can span and represent a variety of networks and network topologies. For example, the communication path 104 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Cable, Ethernet, digital subscriber line (DSL), fiber optic lines, fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
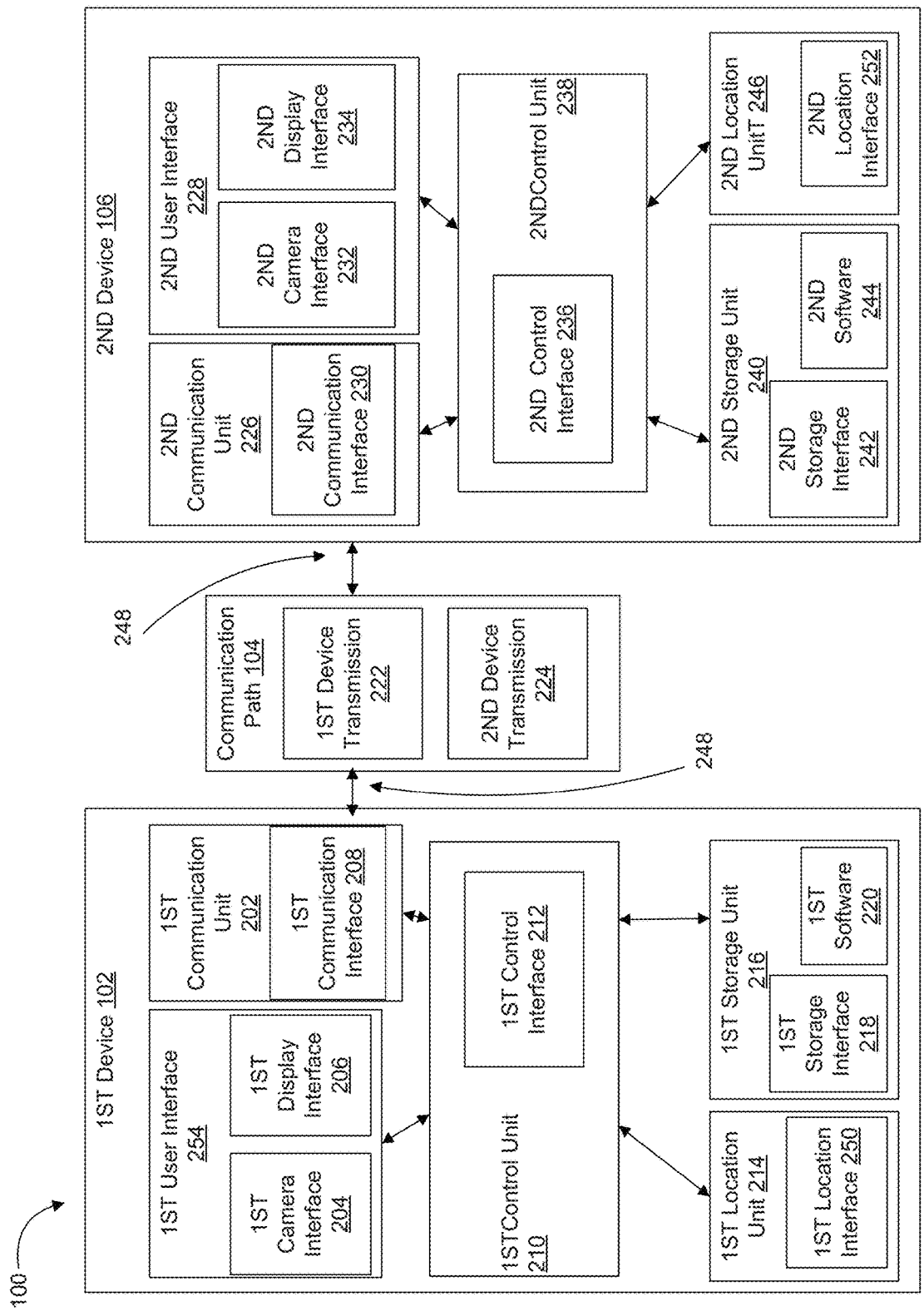
FIG. 2 is an exemplary block diagram of the components of the computing system in an embodiment of the present invention.

Referring now to FIG. 2, therein is shown an exemplary block diagram of the components of the computing system 100 in an embodiment of the present invention. The first device 102 can send information in a first device transmission 222 over the communication path 104 to the second device 106. The second device 106 can send information in a second device transmission 224 over the communication path 104 to the first device 102. The first device transmission 222 and the second device transmission 224 can be sent over one or more communication channels 248. A communication channel 248 refers either to a physical transmission medium such as a wire, or to a logical connection over a multiplexed medium such as a radio channel.

For illustrative purposes, the computing system 100 is shown with the first device 102 as a client device, although it is understood that the computing system 100 can have the first device 102 as a different type of device. For example, the first device 102 can be a server. Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server. The embodiment of the present invention is not limited to this selection for the type of devices. The selection is an example of an embodiment of the present invention.

The first device 102 can include a first control unit 210, a first storage unit 216, a first communication unit 202, a first user interface 254, and a first location unit 214. The first control unit 210 can include a first control interface 212. The first control unit 210 can execute a first software 220 to provide the intelligence of the computing system 100. The first control unit 210 can be implemented in a number of different ways. For example, the first control unit 210 can be a processor, an application specific integrated circuit (ASIC), an embedded processor, a microprocessor, a hardware control logic, a hardware finite state machine (FSM), a digital signal processor (DSP), or a combination thereof.

The first control interface 212 can be used for communication between the first control unit 210 and other functional units in the first device 102. The first control interface 212 can also be used for communication that is external to the first device 102. The first control interface 212 can receive information from the other functional units of the first device 102 or from external sources, or can transmit information to the other functional units of the first device 102 or to external destinations. The external sources and the external destinations refer to sources and destinations external to the first device 102. The first control interface 212 can be implemented in different ways and can include different implementations depending on which functional units or external units are being interfaced with the first control interface 212. For example, the first control interface 212 can be implemented with a pressure sensor, an inertial sensor, a microelectromechanical system (MEMS), optical circuitry, waveguides, wireless circuitry, wireline circuitry, an application programming interface (API), or a combination thereof.

The first storage unit 216 can store the first software 220 to provide the intelligence of the computing system 100. For illustrative purposes, the first storage unit 216 is shown as a single element, although it is understood that the first storage unit 216 can be a distribution of storage elements. Also for illustrative purposes, the computing system 100 is shown with the first storage unit 216 as a single hierarchy storage system, although it is understood that the computing system 100 can have the first storage unit 216 in a different configuration. For example, the first storage unit 216 can be formed with different storage technologies forming a memory hierarchal system including different levels of caching, main memory, rotating media, or off-line storage. The first storage unit 216 can be a volatile memory, a nonvolatile memory, an internal memory, an external memory, or a combination thereof. For example, the first storage unit 216 can be a nonvolatile storage such as non-volatile random access memory (NVRAM), Flash memory, disk storage, or a volatile storage such as static random access memory (SRAM) or dynamic random access memory (DRAM).

The first storage unit 216 can include a first storage interface 218. The first storage interface 218 can be used for communication between the first storage unit 216 and other functional units in the first device 102. The first storage interface 218 can also be used for communication that is external to the first device 102. The first storage interface 218 can receive information from the other functional units of the first device 102 or from external sources, or can transmit information to the other functional units or to external destinations. The first storage interface 218 can include different implementations depending on which functional units or external units are being interfaced with the first storage unit 216. The first storage interface 218 can be implemented with technologies and techniques similar to the implementation of the first control interface 212.

The first communication unit 202 can enable external communication to and from the first device 102. For example, the first communication unit 202 can permit the first device 102 to communicate with the second device 106, the third device 108 of FIG. 1, an attachment, such as a peripheral device, and the communication path 104. The first communication unit 202 can also function as a communication hub allowing the first device 102 to function as part of the communication path 104 and not be limited to be an end point or terminal unit to the communication path 104. The first communication unit 202 can include active and passive components, such as microelectronics or an antenna, for interaction with the communication path 104.

The first communication unit 202 can include a first communication interface 208. The first communication interface 208 can be used for communication between the first communication unit 202 and other functional units of the first device 102. The first communication interface 208 can receive information from the other functional units of the first device 102 or from external sources, or can transmit information to the other functional units or to external destinations. The first communication interface 208 can include different implementations depending on which functional units are being interfaced with the first communication unit 202. The first communication interface 208 can be implemented with technologies and techniques similar to the implementation of the first control interface 212.

The first communication unit 202 can couple with the communication path 104 to send information to the second device 106 in the first device transmission 222. The second device 106 can receive information in a second communication unit 226 from the first device 102 in the first device transmission 222 through the communication path 104.

The first user interface 254 can present information generated by the computing system 100. In one embodiment, the first user interface 254 allows the customer 112 to interface with the first device 102. The first user interface 254 can include an input device and an output device. Examples of the input device of the first user interface 254 can include a first camera interface 204, a keypad, buttons, switches, touchpads, soft-keys, a keyboard, a microphone, sensors for receiving remote signals, or any combination thereof to provide data and communication inputs. Examples of the output device can include a first display interface 206. The first control unit 210 can operate the first user interface 254 to present information generated by the computing system 100 or to obtain information for the computing system 100. The first control unit 210 can also execute the first software 220 to present information generated by the computing system 100, to obtain information for the computing system 100, or to control other functional units of the computing system 100.

The first display interface 206 can be any graphical user interface such as a display, a projector, a video screen, or any combination thereof. The first camera interface 204 can include a camera, an image capturing device, an image sensor, a video recorder, or components thereof for example, a color balancer, a wave form monitor, or any combination thereof. The first display interface 206 and the first camera interface 204 allow the customer 112 to interact with the computing system 100.

The first location unit 214 can generate location information, current heading, and current speed and acceleration of the first device 102, as examples. The first location unit 214 can be implemented in many ways. For example, the first location unit 214 can function as at least a part of a global positioning system (GPS) and can include components, such as a GPS receiver, an inertial navigation system, a cellular-tower location system, a pressure location system, an accelerometer, a gyroscope, or any combination thereof.

The first location unit 214 can include a first location interface 250. The first location interface 250 can be used for communication between the first location unit 214 and other functional units in the first device 102. The first location interface 250 can also be used for communication that is external to the first device 102. The first location interface 250 can be implemented with technologies and techniques similar to the implementation of the first control interface 212.

The second device 106 can be optimized for implementing an embodiment of the present invention in a multiple device embodiment with the first device 102 and the third device 108 of FIG. 1. The second device 106 can provide additional or higher performance processing power compared to the first device 102, the third device 108, or a combination thereof. The second device 106 can include a second control unit 238, a second storage unit 240, a second communication unit 226, a second user interface 228, and a second location unit 246.

The second control unit 238 can include a second control interface 236. The second control unit 238 can execute a second software 244 to provide the intelligence of the computing system 100. The second software 244 can operate independently or in conjunction with the first software 220. The second control unit 238 can provide additional performance compared to the first control unit 210. The second control unit 238 can be implemented in a number of different ways. For example, the second control unit 238 can be a processor, an application specific integrated circuit (ASIC), an embedded processor, a microprocessor, a hardware control logic, a hardware finite state machine (FSM), a digital signal processor (DSP), or a combination thereof.

The second control unit 238 can include a second control interface 236. The second control interface 236 can be used for communication between the second control unit 238 and other functional units of the second device 106. The second control interface 236 can also be used for communication that is external to the second device 106. The second control interface 236 can receive information from the other functional units of the second device 106 or from external sources, or can transmit information to the other functional units of the second device 106 or to external destinations. The external sources and the external destinations refer to sources and destinations external to the second device 106. The second control interface 236 can be implemented in different ways and can include different implementations depending on which functional units or external units are being interfaced with the second control interface 236. For example, the second control interface 236 can be implemented with a pressure sensor, an inertial sensor, a microelectromechanical system (MEMS), optical circuitry, waveguides, wireless circuitry, wireline circuitry, an application programming interface, or a combination thereof.

The second storage unit 240 can store the second software 244 to provide the intelligence of the computing system 100. The second storage unit 240 can be sized to provide the additional storage capacity to supplement the first storage unit 216. For illustrative purposes, the second storage unit 240 is shown as a single element, although it is understood that the second storage unit 240 can be a distribution of storage elements. Also for illustrative purposes, the computing system 100 is shown with the second storage unit 240 as a single hierarchy storage system, although it is understood that the computing system 100 can have the second storage unit 240 in a different configuration. For example, the second storage unit 240 can be formed with different storage technologies forming a memory hierarchal system including different levels of caching, main memory, rotating media, or off-line storage. The second storage unit 240 can be a volatile memory, a nonvolatile memory, an internal memory, an external memory, or a combination thereof. For example, the second storage unit 240 can be a nonvolatile storage such as non-volatile random access memory (NVRAM), Flash memory, disk storage, or a volatile storage such as static random access memory (SRAM) or dynamic random access memory (DRAM).

The second storage unit 240 can include a second storage interface 242. The second storage interface 242 can be used for communication between the second storage unit 240 and other functional units of the second device 106. The second storage interface 242 can also be used for communication that is external to the second device 106. The second storage interface 242 can receive information from the other functional units of the second device 106 or from external sources, or can transmit information to the other functional units or to external destinations. The second storage interface 242 can include different implementations depending on which functional units or external units are being interfaced with the second storage unit 240. The second storage interface 242 can be implemented with technologies and techniques similar to the implementation of the second control interface 236.

The second communication unit 226 can enable external communication to and from the second device 106. For example, the second communication unit 226 can permit the second device 106 to communicate with the first device 102, the third device 108 of FIG. 1, an attachment, such as a peripheral device, and the communication path 104. The second communication unit 226 can also function as a communication hub allowing the second device 106 to function as part of the communication path 104 and not be limited to be an end point or terminal unit to the communication path 104. The second communication unit 226 can include active and passive components, such as microelectronics or an antenna, for interaction with the communication path 104.

The second communication unit 226 can couple with the communication path 104 to send information to the first device 102 in the second device transmission 224. The first device 102 can receive information in a first communication unit 202 from the second device 106 in the second device transmission 224 through the communication path 104.

The second communication unit 226 can include a second communication interface 230. The second communication interface 230 can be used for communication between the second communication unit 226 and other functional units of the second device 106. The second communication interface 230 can receive information from the other functional units of the second device 106 or from external sources, or can transmit information to the other functional units or to external destinations. The second communication interface 230 can include different implementations depending on which functional units are being interfaced with the second communication unit 226. The second communication interface 230 can be implemented with technologies and techniques similar to the implementation of the second control interface 236.

The second user interface 228 can present information generated by the computing system 100. In one embodiment, the second user interface 228 allows a user of the computing system 100 to interface with the second device 106. The second user interface 228 can include an input device and an output device. Examples of the input device of the second user interface 228 can include a second camera interface 232, a keypad, buttons, switches, touchpads, softkeys, a keyboard, a microphone, sensors for receiving remote signals, or any combination thereof to provide data and communication inputs. Examples of the output device can include a second display interface 234. The second control unit 238 can operate the second user interface 228 to present information generated by the computing system 100 or to obtain information for the computing system 100. The second control unit 238 can also execute the second software 244 to present information generated by the computing system 100, to obtain information for the computing system 100, or to control other functional units of the computing system 100.

The second display interface 234 can be any graphical user interface such as a display, a projector, a video screen, or any combination thereof. The second camera interface 232 can include a camera, an image capturing device, an image sensor, a video recorder, or components thereof for example, a color balancer, a wave form monitor, or any combination thereof. The second display interface 234 and the second camera interface 232 allow a user of the computing system 100 to interact with the computing system 100.

The second location unit 246 can generate location information, current heading, and current speed and acceleration of the second device 106, as examples. The second location unit 246 can be implemented in many ways. For example, the second location unit 246 can function as at least a part of a global positioning system (GPS) and can include components, such as a GPS receiver, an inertial navigation system, a cellular-tower location system, a pressure location system, an accelerometer, a gyroscope, or any combination thereof.

The second location unit 246 can include a second location interface 252. The second location interface 252 can be used for communication between the second location unit 246 and other functional units of the second device 106. The second location interface 252 can also be used for communication that is external to the second device 106. The second location interface 252 can be implemented with technologies and techniques similar to the implementation of the second control interface 236.

Figure 3:
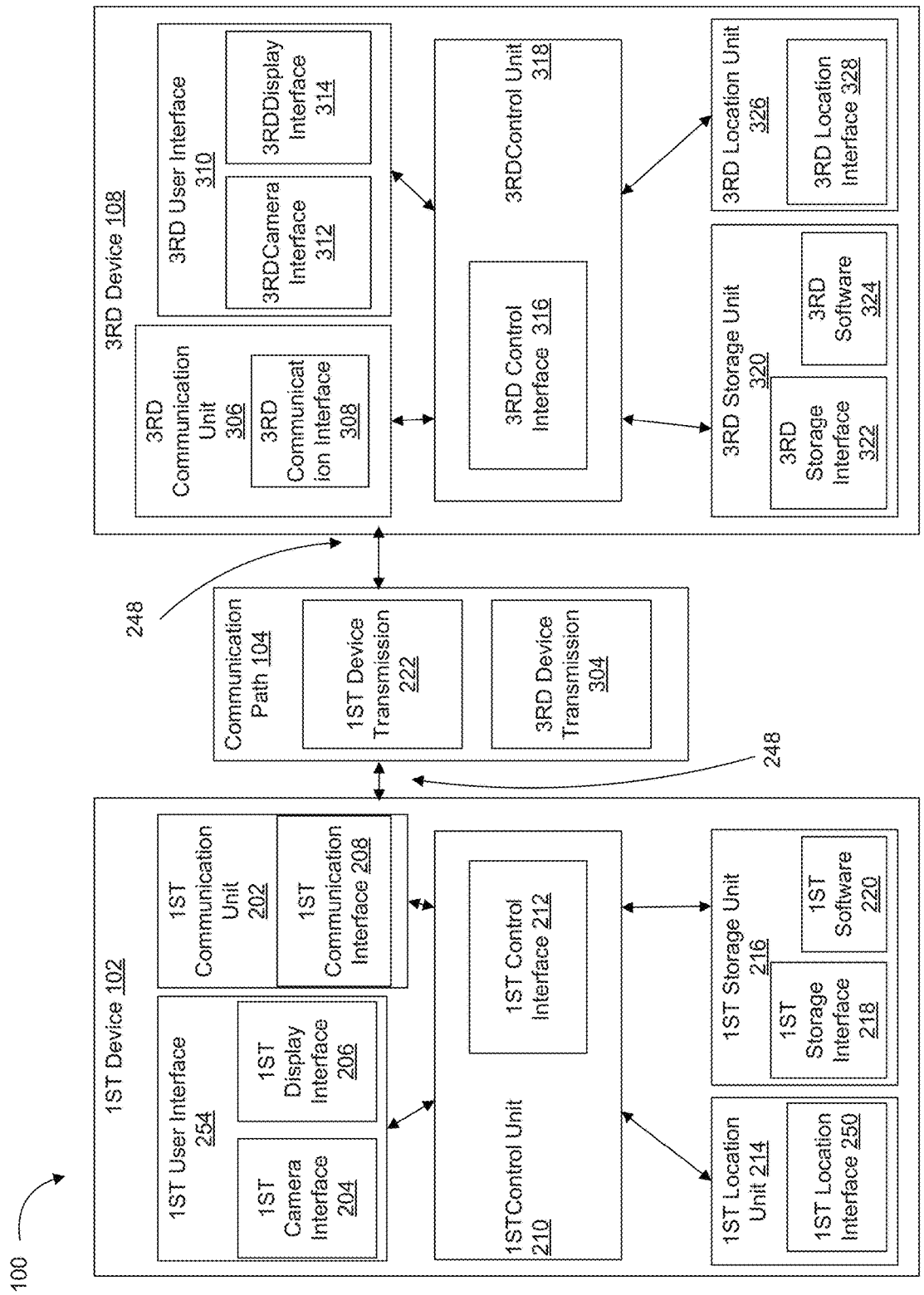
FIG. 3 is a further exemplary block diagram of the components of the computing system in an embodiment of the present invention.

Referring now to FIG. 3, therein is shown a further exemplary block diagram of the components of the computing system 100 in an embodiment of the present invention. The computing system 100 can further include the third device 108. The third device 108 can be optimized for implementing an embodiment of the present invention in a multiple device embodiment with the first device 102 and the second device 106 of FIGS. 1 and 2. The third device 108 can provide additional or higher performance processing power compared to the first device 102, the second device 106, or a combination thereof. The third device 108 can send information in a third device transmission 304 over the communication path 104 to the first device 102. While not shown, the third device 108 can also send information in the third device transmission 304 over the communication path 104 to the second device 106 of FIGS. 1 and 2. The first device 102 can send information in a first device transmission 222 over the communication path 104 to the third device 108. The first device transmission 222 and the third device transmission 304 can be sent over one or more communication channels 248.

For illustrative purposes, the computing system 100 is shown with the first device 102 as a client device, although it is understood that the computing system 100 can have the first device 102 as a different type of device. For example, the first device 102 can be a server. Also for illustrative purposes, the computing system 100 is shown with the third device 108 as a client device, although it is understood that the computing system 100 can have the third device 108 as a different type of device. For example, the third device 108 can be a server.

For brevity of description in this embodiment of the present invention, the first device 102 will be described as a client device and the third device 108 will be described as a client device. The embodiment of the present invention is not limited to this selection for the type of devices. The selection is an example of an embodiment of the present invention.

The third device 108 can include a third control unit 318, a third storage unit 320, a third communication unit 306, a third user interface 310, and a third location unit 326. The third control unit 318 can execute a third software 324 to provide the intelligence of the computing system 100. The third software 324 can operate independently or in conjunction with the first software 220, the second software 244 of FIG. 2, or a combination thereof. The third control unit 318 can be implemented in a number of different ways. For example, the third control unit 318 can be a processor, an application specific integrated circuit (ASIC), an embedded processor, a microprocessor, a hardware control logic, a hardware finite state machine (FSM), a digital signal processor (DSP), or a combination thereof.

The third control unit 318 can include a third control interface 316. The third control interface 316 can be used for communication between the third control unit 318 and other functional units in the third device 108. The third control interface 316 can also be used for communication that is external to the third device 108. The third control interface 316 can receive information from the other functional units of the third device 108 or from external sources, or can transmit information to the other functional units or to external destinations. The external sources and the external destinations refer to sources and destinations external to the third device 108. The third control interface 316 can be implemented in different ways and can include different implementations depending on which functional units or external units are being interfaced with the third control interface 316. For example, the third control interface 316 can be implemented with a pressure sensor, an inertial sensor, a microelectromechanical system (MEMS), optical circuitry, waveguides, wireless circuitry, wireline circuitry, an application programming interface (API), or a combination thereof.

The third storage unit 320 can store the third software 324 to provide the intelligence of the computing system 100. For illustrative purposes, the third storage unit 320 is shown as a single element, although it is understood that the third storage unit 320 can be a distribution of storage elements. Also for illustrative purposes, the computing system 100 is shown with the third storage unit 320 as a single hierarchy storage system, although it is understood that the computing system 100 can have the third storage unit 320 in a different configuration. For example, the third storage unit 320 can be formed with different storage technologies forming a memory hierarchal system including different levels of caching, main memory, rotating media, or off-line storage. The third storage unit 320 can be a volatile memory, a nonvolatile memory, an internal memory, an external memory, or a combination thereof. For example, the third storage unit 320 can be a nonvolatile storage such as non-volatile random access memory (NVRAM), Flash memory, disk storage, or a volatile storage such as static random access memory (SRAM) or dynamic random access memory (DRAM).

The third storage unit 320 can include a third storage interface 322. The third storage interface 322 can be used for communication between the third storage unit 320 and other functional units in the third device 108. The third storage interface 322 can also be used for communication that is external to the third device 108. The third storage interface 322 can receive information from the other functional units of the third device 108 or from external sources, or can transmit information to the other functional units or to external destinations. The third storage interface 322 can include different implementations depending on which functional units or external units are being interfaced with the third storage unit 320. The third storage interface 322 can be implemented with technologies and techniques similar to the implementation of the third control interface 316.

The third communication unit 306 can enable external communication to and from the third device 108. For example, the third communication unit 306 can permit the third device 108 to communicate with the second device 106 of FIGS. 1 and 2, the first device 102, an attachment, such as a peripheral device, and the communication path 104. The third communication unit 306 can also function as a communication hub allowing the third device 108 to function as part of the communication path 104 and not be limited to be an end point or terminal unit to the communication path 104. The third communication unit 306 can include active and passive components, such as microelectronics or an antenna, for interaction with the communication path 104.

The third communication unit 306 can include a third communication interface 308. The third communication interface 308 can be used for communication between the third communication unit 306 and other functional units of the third device 108. The third communication interface 308 can receive information from the other functional units of the third device 108 or from external sources, or can transmit information to the other functional units or to external destinations. The third communication interface 308 can include different implementations depending on which functional units are being interfaced with the third communication unit 306. The third communication interface 308 can be implemented with technologies and techniques similar to the implementation of the third control interface 316.

The third user interface 310 can present information generated by the computing system 100. In one embodiment, the third user interface 310 allows the customer 112 to interface with the third device 108. The third user interface 310 can include an input device and an output device. Examples of the input device of the third user interface 310 can include a third camera interface 312, a keypad, buttons, switches, a touchpad, soft-keys, a keyboard, a microphone, sensors for receiving remote signals, or any combination thereof to provide data and communication inputs. Examples of the output device can include a third display interface 314. The third control unit 318 can operate the third user interface 310 to present information generated by the computing system 100 or to obtain information for the computing system 100. The third control unit 318 can also execute the third software 324 to present information generated by the computing system 100, to obtain information for the computing system 100, or to control other functional units of the computing system 100.

The third display interface 314 can be any graphical user interface such as a display, a projector, a video screen, or any combination thereof. The third camera interface 312 can include a camera, an image capturing device, an image sensor, a video recorder, or components thereof for example, a color balancer, a wave form monitor, or any combination thereof. The third display interface 314 and the third camera interface 312 allow the customer 112 of the computing system 100 to interact with the computing system 100.

The third location unit 326 can generate location information, current heading, and current speed and acceleration of the third device 108, as examples. The third location unit 326 can be implemented in many ways. For example, the third location unit 326 can function as at least a part of a global positioning system (GPS) and can include components, such as a GPS receiver, an inertial navigation system, a cellular-tower location system, a pressure location system, an accelerometer, a gyroscope, or any combination thereof.

The third location unit 326 can include a third location interface 328. The third location interface 328 can be used for communication between the third location unit 326 and other functional units in the third device 108. The third location interface 328 can also be used for communication that is external to the third device 108. The third location interface 328 can be implemented with technologies and techniques similar to the implementation of the third control interface 316.

Functionality of the computing system 100 can be provided by the first control unit 210, the second control unit 238, the third control unit 318, or a combination thereof. For illustrative purposes, the first device 102 is shown with the partition having the first user interface 254, the first storage unit 216, the first control unit 210, the first location unit 214, and the first communication unit 202, although it is understood that the first device 102 can have a different partition. For example, the first software 220 can be partitioned differently such that some or all of its functionality can be, for example, in the first control unit 210 and the first communication unit 202. Also, the first device 102 can include other functional units not shown in FIGS. 2 and 3 for clarity.

The second device 106 of FIGS. 1 and 2 and the third device 108 can have a similar or different partition as the first device 102. The functional units in the second device 106 can work individually and independently of the other functional units of the second device 106. The functional units of the third device 108 can work individually and independently of the other functional units of the third device 108. The functional units of the first device 102 can work individually and independently of the other functional units of the first device 102.

The second device 106 can work individually and independently from the first device 102, the third device 108, and the communication path 104. The third device 108 can work individually and independently from the first device 102, the second device 106, and the communication path 104. The first device 102 can work individually and independently from the second device 106, the third device 108, and the communication path 104.

For illustrative purposes, the computing system 100 is described by operation of the first device 102, the second device 106, and the third device 108. It is understood that the first device 102, the second device 106, and the third device 108 can operate any of the modules, units, or services of the computing system 100.

Figure 4:
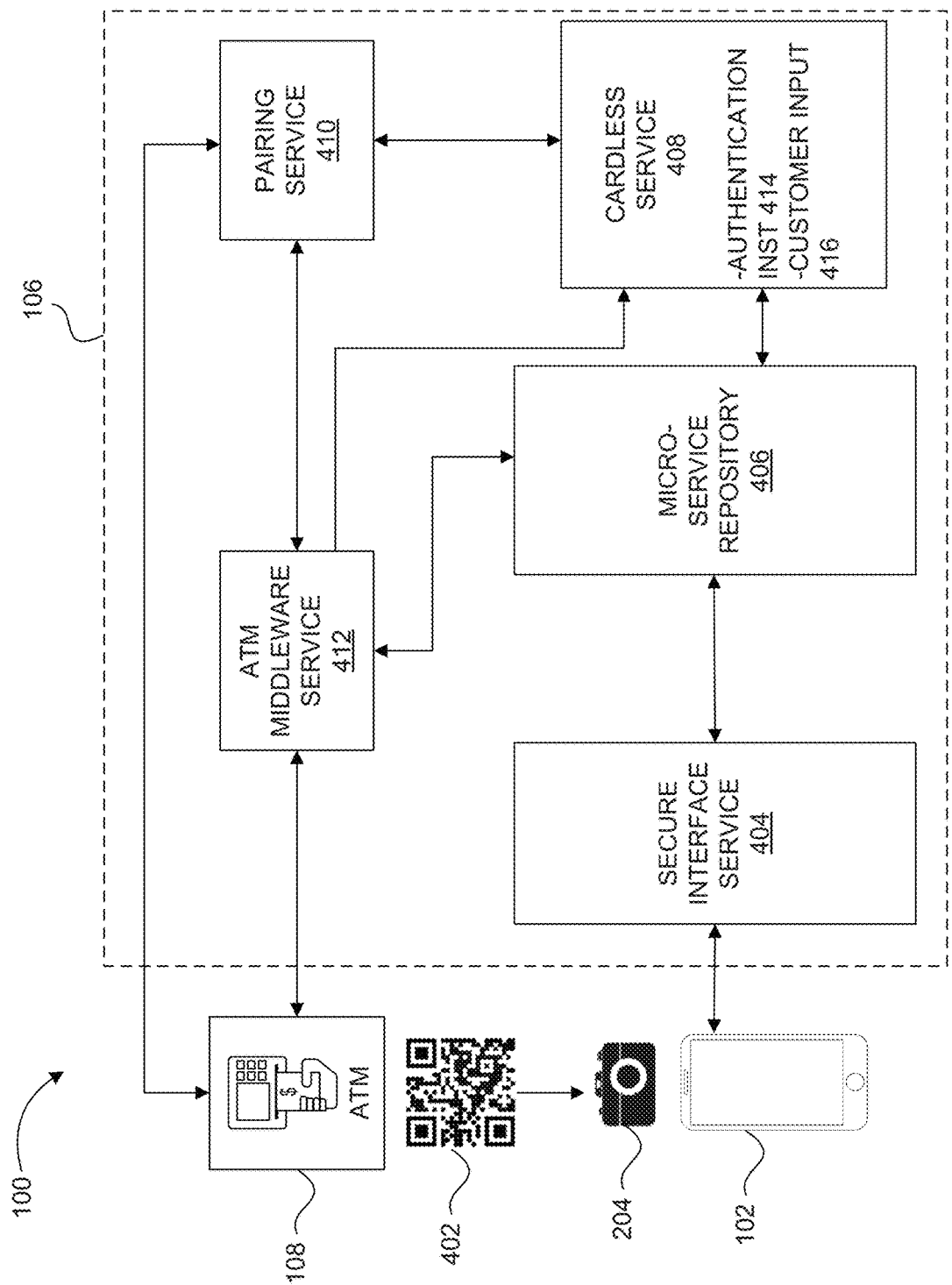
FIG. 4 is an exemplary architecture of the computing system in an embodiment of the present invention.

Referring now to FIG. 4, therein is shown an exemplary architecture of the computing system 100 in an embodiment of the present invention. In one embodiment, the architecture of the computing system 100 can be implemented based on one or more services and sub-services. In one embodiment, the services and sub-services can allow the customer 112, via a client device, for example the first device 102, the third device 108, or a combination thereof to conduct one or more transactions, via a server, for example the second device 106. Transactions refer to one or more communication, commercial, entertainment, or educational dealings conducted between the customer 112 and an institution. The institution can be for example, a company such as a bank or an entertainment service provider. The institution can also be a transportation authority such as a subway/metro service, an airport or airline service, a highway toll booth. Examples of transactions with a bank can include one or more banking related dealings, including accessing a bank account, checking the status of a bank account, withdrawing money from a bank account, transferring money to and from a bank account, depositing money into a bank account, or a combination thereof. Transactions with a transportation authority can include purchasing a ticket, scheduling or rescheduling a trip, depositing funds onto a fair card, receiving a refund, checking the status of a trip, or a combination thereof. Transactions with an entertainment service provider can include purchasing entertainment content, such as a movie, music, or printed publications such as books or magazines, purchasing tickets, returning tickets, or a combination thereof. While the examples with respect to transactions in this application and this FIG. 4 refer to transactions with banks via a client device such as the first device 102 and the third device 108, this is not meant to be limiting. Other forms of transactions are envisioned that can use the exemplary architecture of the computing system 100 described in this FIG. 4.

Continuing with the example, in one embodiment, the services and sub-services can further allow the customer 112, via the client device, for example the first device 102, to control the operation of another client device, for example the third device 108, via the server, for example the second device 106, by enabling pairing or otherwise connection of the client devices, for example the first device 102 and the third device 108 via the server, for example the second device 106. Further details regarding pairing will be discussed below.

In one embodiment, as shown in FIG. 4, the services and sub-services can be located, stored, performed, executed, or a combination thereof in and by a server, for example the second device 106. This, however, is merely exemplary, and in other embodiments the services and sub-services can be located, stored, performed, executed, or a combination thereof in and by a client device, for example the first device 102, the third device 108, or a combination thereof, or in and by a client device in conjunction with a server.

Continuing with the example, in one embodiment, the services and sub-services can include a secure interface service 404, a micro-service repository 406, a cardless service 408, a pairing service 410, and an ATM middleware service 412. In one embodiment, the secure interface service 404 can couple to the micro-service repository 406 and a client device, for example the first device 102. The micro-service repository 406 can couple to the cardless service 408 and the ATM middleware service 412. The cardless service 408 can couple to the pairing service 410 and the ATM middleware service 412. The pairing service 410 can couple to the ATM middleware service 412 and a client device, for example the third device 108. The ATM middleware service can couple to a client device, for example the third device 108.

The secure interface service 404 enables secure communications between the bank, via the server, and a client device, to allow the customer 112 to securely conduct the transactions with the bank via the client device. For example, the secure interface service 404 can enable secure communications by, for example, preventing improper access attempts by a client device, such as the first device 102 against the bank via the server, or can prevent improper access by a client device, for example the first device 102, to another client device, for example the third device 108. In one embodiment, if improper access attempts are detected, the secure interface service 404 can terminate communications between the one or more devices or the server. Improper access attempts can be, for example, distributed denial of service (DDoS) attacks, injection attacks, hacks, malware attacks, trojan horse attacks, computer virus attacks, phishing attempts, or a combination thereof.

In one embodiment, the secure interface service 404 can detect the improper access attempt by, for example, enabling and executing a virus detection software, a computer monitoring software, a firewall, a malware protection software, or monitoring a computer log, a file system integrity, one or more computer files, one or more hyperlinks sent to or from a client device, the execution of one or more computer programs, or a combination thereof, that can identify improper access attempts. In one embodiment, if the secure interface service 404 does not detect improper access attempts by the client device, the secure interface service 404 can allow the client device to access one or more of the services or sub-services, for example the micro-service repository 406, to further enable completion of the transactions by the customer 112.

The micro-service repository 406 refers to the services or sub-services that enables access to a programming code, for example pre-written code, classes, procedures, routines, scripts, configuration data, or a combination thereof, that enable the transactions between the customer 112 and the bank via the client device and the server. For example, the micro-service repository 406 can enable access, by the client device, the server, or a combination thereof to programming code that enables the customer 112 access to a bank account, check the status of a bank account, withdraw money from a bank account, transfer money to and from a bank account, deposit money into a bank account, or a combination thereof, via the client device. In one embodiment, the micro-service repository can enable access to the programming code directly or through one or more APIs. In one embodiment, the APIs can allow the client device, the server, or a combination thereof to access third party systems, third party servers, third party repositories, or a combination thereof, to access the programming code. A third party refers to an entity other than the customer 112 or the bank.

The cardless service 408 enables a customer 112 via a client device, for example the first device 102, to interact with another client device, for example the third device 108, via the server, for example the second device 106, without the need to have a physical bank issued card, such as a debit card or a credit card to conduct transactions with the bank. In one embodiment, the cardless service 408 can enable the customer 112 to authenticate him or herself using one or more authentication instructions 414. The authentication instructions 414 refer to one or more variables, passcodes, words, phrases, questions, images, biometric factors, usernames and passwords, access keys, or a combination thereof used to verify the identity of the customer 112. For example, in one embodiment, the cardless service 408 can send one or more of the authentication instructions 414 to the customer 112, via the server, to a client device, for example the first device 102, and receive a customer input variable 416 from the customer 112 based on the authentication instructions 414. The customer input variable 416 refers to a variable, parameter, text or numerical inputs, images, biometric factors, or a combination thereof the customer 112 inputs or is obtained or otherwise provided from the customer 112 based on the authentication instructions 414, for example the answer to a question or the verification of a passcode sent to the customer 112 as the authentication instructions 414.

Continuing with the example, based on comparing the customer input variable 416 and the authentication instructions 414, the cardless services 408 can enable authentication of the identity of the customer 112. In one embodiment, the cardless services 408 can further enable the completion of the transactions by the customer 112 by coupling to the pairing service 410 and pairing a client device, for example the first device 102, and another client device, for example the third device 108.

The pairing service 410 enables the pairing of one or more client devices via the server. For example, the pairing service 410 can enable the pairing of the first device 102 and the third device 108 via the second device 106. In one embodiment, the pairing service 410 can pair the one or more client devices based on enabling the generation of a barcode 402 containing a unique identifier. The barcode 402 refers to a visual machine-readable representation of data. The barcode 402 can be, for example, a linear or one-dimensional barcode, such as a series of lines with variable spaces in between them, a matrix or two-dimensional barcode, such as a QR code, or a combination thereof. The specific configuration of the barcode can constitute the unique identifier. In one embodiment, the pairing service 410 can enable the transmission of the barcode 402 to a client device to establish and maintain the pairing between the client devices. For example, in one embodiment, the third device 108 can display the barcode 402 on the third display interface 314. The customer 112 via the first device 102 can scan the barcode 402 using the first camera interface 204. Based on scanning the barcode 402, the first device 102 can communicate with one or more services or sub-services, including but not limited to the secure interface service 404, the micro-service repository 406, the cardless service 408, the ATM middleware service 412, or a combination thereof, which can establish that the scanned barcode 402 received from the first device 102 matches the barcode 402 generated by the pairing service 410, and can notify the pairing service 410, in addition to other services or sub-services to establish a connection between the first device 102 and the third device 108 so the customer 112 can conduct one or more transactions with the bank via a client device, for example the first device 102.

In one embodiment, the pairing service 410 can enable the further re-generation of the barcode 402 after some instance of time, for example, after ten (10) seconds or fifteen (15) seconds, as examples. The re-generation of the barcode 402 in this manner can further add to the security of the computing system 100 so as to avoid having the re-use of the barcode 402 across multiple client devices, for example across multiple ATMs, so as to prevent the customer 112 from conducting duplicate transactions, such as duplicate withdrawals of money, duplicate transfers of money, or a combination thereof.

The ATM middleware service 412 enables the coordination of the services or sub-services of the computing system 100. The ATM middleware service 412 can coordinate the services or sub-services by coordinating tasks, functions, routines, communication, or a combination thereof of the services and sub-services between one another, and between the services or sub-services and one or more client devices, for example the third device 108. In this way, the ATM middleware service 412 acts as a controller between the services and sub-services and the devices of the computing system 100.

The computing system 100 has been described with the services or sub-services functions or order as an example. The computing system 100 can partition the services and sub-services differently or order the services or sub-services differently. For example, the first device 102, the second device 106, the third device 108, or a combination thereof, can include the services or sub-services of the computing system 100. As a specific example, the first device 102, the second device 106, the third device 108, or a combination thereof can include one or more of the secure interface service 404, the micro-service repository 406, the cardless service 408, the pairing service 410, and the ATM middleware service 412, and associated sub-services and modules included therein.

Figure 5:
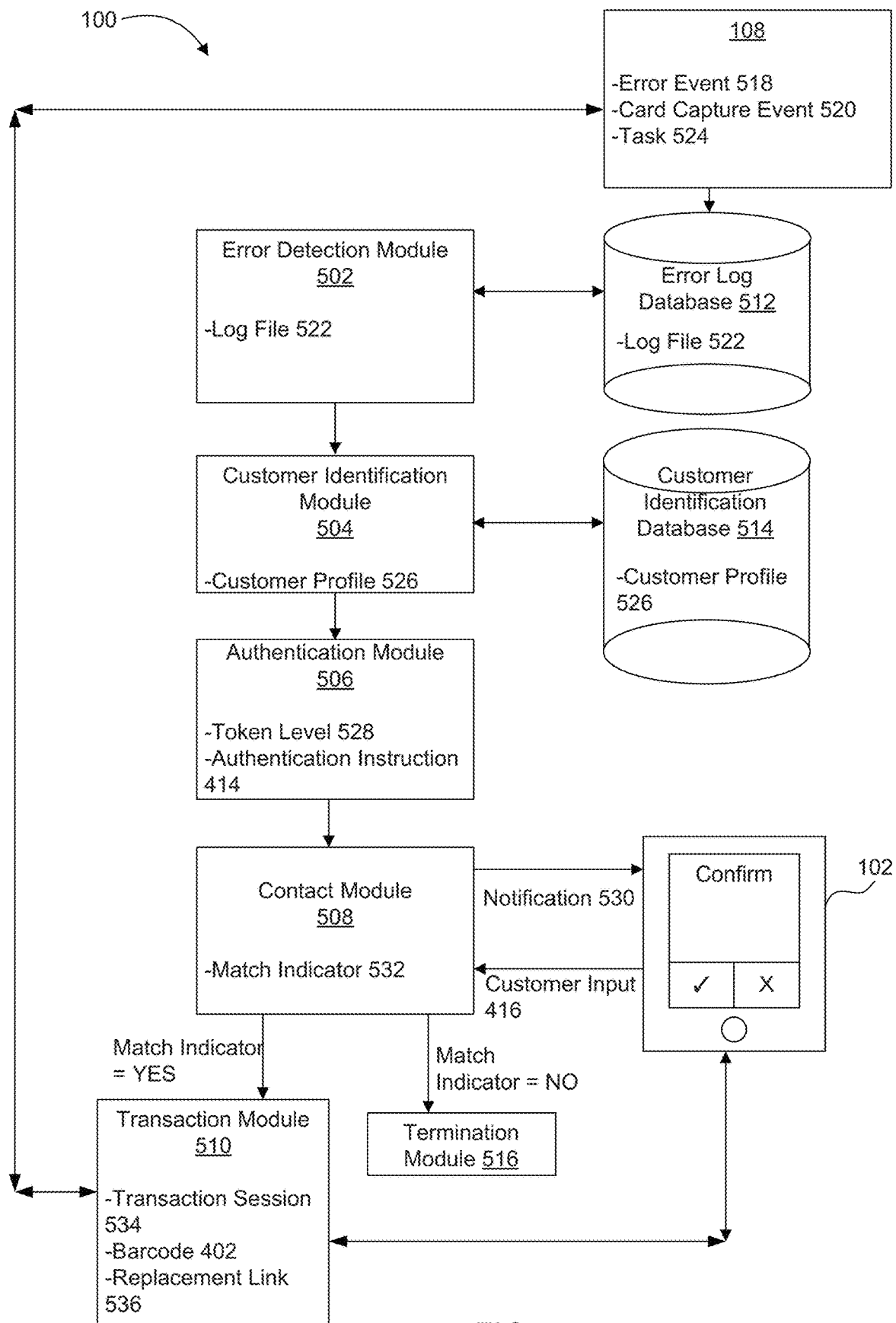
FIG. 5 is an exemplary control flow of the computing system in an embodiment of the present invention.

Referring now to FIG. 5, therein is shown an exemplary control flow of the computing system 100 in an embodiment of the present invention. In one embodiment, the control flow can be implemented with modules and sub-modules. In one embodiment, the control flow can include an error detection module 502, a customer identification module 504, an authentication module 506, a contact module 508, a transaction module 510, and a termination module 516. In one embodiment, the error detection module 502 can couple to the customer identification module 504. The customer identification module 504 can couple to the authentication module 506. The authentication module 506 can couple to the contact module 508. The contact module 508 can couple to the transaction module 510 and the termination module 516.

In one embodiment, the services or sub-services can contain the modules or sub-modules. For example, in one embodiment, the secure interface service 404, the micro-service repository 406, the cardless service 408, the pairing service 410, and the ATM middleware service 412 can contain the error detection module 502, the customer identification module 504, the authentication module 506, the contact module 508, the transaction module 510, the termination module 516, and associated sub-modules.

The error detection module 502 enables the detection of an error event 518 of a client device, for example the third device 108. The error event 518 refers to an instance where the client device malfunctions such that the customer 112 cannot complete transactions with the bank using a client device, for example the third device 108. The error event 518 can include, for example, a mechanical malfunction of the client device, for example a malfunction of one or more components of the client device, a software malfunction of the client device, or a card capture error event 520 by the client device, for example the third device 108, captures or otherwise does not release or give back to the customer 112 a physical bank issued card, such as a debit card, a credit card, or a combination thereof associated with the customer 112.

In one embodiment, the error detection module 502 can enable the detection of the error event 518 based on parsing a log file 522. The log file 522 refers to a computer file that records one or more events, including the error event 518 that can occur in an operating system, the software, the hardware, or a combination thereof of the client device. For example, in one embodiment, the log file 522 can contain information regarding which software or hardware components have malfunctioned, for example what modules or units of the client device has malfunctioned. In one embodiment, the log file 522 can further contain information regarding the card capture error event 520, for example whether a card was captured, how many cards have been captured in the client device, a weight associated with the cards that have been captured in the client device, or a combination thereof.

In one embodiment, the log file 522 can further include information regarding the customer 112, such as a name, an account information, or a combination thereof associated with the error event 518. In one embodiment, the log file 522 can further include information regarding a task 524 that the customer 112 is trying to accomplish using the client device prior to encountering the error event 518. The task 524 can be associated with the transactions the customer 112 wants to conduct with the bank. For example, the task 524 can include entering a pin, pressing a button, or choosing one or more options to access a bank account, check the status of a bank account, withdraw money from a bank account, transfer money to and from a bank account, deposit money into a bank account, or a combination thereof.

In one embodiment, the log file 522 can be, for example, a text file, such as a Microsoft™ Word file, a Notepad file, or a similar text based file. In one embodiment, the log file 522 can be generated by a client device, for example the third device 108, and can be transmitted to an error log database 512.

The error log database 512 refers to a database, a repository, a list, a table, or a combination thereof that stores the log file 522. The error log database 512, can be implemented using a volatile memory, a nonvolatile memory, an internal memory, an external memory, or a combination thereof. For example, the error log database 512 can be implemented using a nonvolatile storage such as non-volatile random access memory (NVRAM), Flash memory, disk storage, or a volatile storage such as static random access memory (SRAM) or dynamic random access memory (DRAM). In one embodiment, the error log database 512 can further be implemented as a database, a repository, a list, a table, or a combination thereof using software, hardware, or a combination thereof using the above mentioned memory components.

Continuing with the example, the error detection module 502 can parse the log file 522 by, for example, analyzing text, numbers, tags, codes, or a combination thereof, and extracting information from the log file 522. In one embodiment, based on parsing the log file 522, the error detection module 502 can detect the error events 518, the task 524, or a combination thereof, and the customer 112 information associated with the error events 518, the task 524, or a combination thereof. By way of example, in the instance where the error detection module 502 is determining whether a card capture error event 520, has occurred, the error detection module 502 can parse the log file 522 for text, numbers, tags, codes, or a combination thereof associated with a card capture error event 520. For example, the log file 522 can contain text or a tag called "CARD CAPTURE ERROR." The error detection module 502 upon parsing the log file 522 and encountering the text or the tag can determine that a card capture error event 520 has occurred. The error detection module 502 can further parse the log file to find a customer 112 name, account number, or a combination thereof associated with the error, by for example searching for tags or text containing the customer 112 name, account number, or a combination thereof.

In another embodiment, the log file 522 can contain further information indicating a card capture error event 520, for example a number of bank cards stored in the client device, which can be recorded in the log file 522 every time a physical bank issued card is captured, a weight threshold representing the weight of a physical bank issued card which can be recorded in the log file 522 every time a bank card is captured, or a combination thereof. The further information can also be used to determine a card capture error event 520. For example, the error detection module 502 upon parsing the log file 522 can search for a tag, text, number, or a combination thereof indicating the number of bank cards stored or whether the number of bank cards stored on the client device has been updated, or search for a weight threshold representing the weight of a physical bank issued card or whether the weight threshold has been updated. Based on encountering the text, tag, number, or a combination thereof related to the number of bank cards or the weight threshold, the error detection module 502 can determine that a card capture error event 520 has occurred.

In one embodiment, once the error detection module 502 parses the log file 522 and detects the error events 518, the customer 112 information associated with the error events 518, the task 524, or a combination thereof, the error detection module 502 can pass the extracted information to the customer identification module 504 for further processing.

The customer identification module 504 can enable identification and receipt of detailed information related to the customer 112 based on the extracted information obtained by parsing the log file 522. The detailed information can identify the customer 112 and include further specific information about the customer 112, for example, further personal information including a social security number, an account information, a username and password, an address, a driver's license information, one or more security questions and answers used to verify the customer 112, biometric information, including, for example a retina map, a fingerprint, a facial map, a voice recognition information, or a combination thereof. In one embodiment, the detailed information can be stored in a customer profile 526. The customer profile 526 refers to the collection of the detailed customer 112 information in a database, a table, a data structure, a file, or a combination thereof.

In one embodiment, the customer identification module 504 can obtain or otherwise receive the customer profile 526 by accessing a customer identification database 514. The customer identification database 514 refers to a database, a repository, a list, a table, or a combination thereof that stores the customer profile 526. The customer identification database 514, can be implemented using a volatile memory, a nonvolatile memory, an internal memory, an external memory, or a combination thereof. For example, the customer identification database 514 can be implemented using a nonvolatile storage such as non-volatile random access memory (NVRAM), Flash memory, disk storage, or a volatile storage such as static random access memory (SRAM) or dynamic random access memory (DRAM). In one embodiment, the customer identification database 514 can further be implemented as a database, a repository, a list, a table, or a combination thereof implemented using software, hardware, or a combination thereof using the above mentioned memory components.

Continuing with the example, in one embodiment, the customer identification module 504 can obtain the customer profile 526 by, for example, searching for the customer 112 name or account information obtained from parsing the log file 522 in the customer identification database 514. If the customer identification module 504 finds the same customer 112 name or account information in the customer identification database 514, the customer identification module 504 can request and receive further customer 112 information, for example the customer profile 526 associated with the customer 112. In one embodiment, once the customer identification module 504 obtains the customer profile 526, the customer identification module 504 can pass control and the customer profile 526 to the authentication module 506 for further processing.

The authentication module 506 can enable the verification or authentication of the identity of the customer 112 based on the customer profile 526 and the extracted information from parsing the log file 522. For example, in one embodiment, the authentication module 506 can enable the verification of the customer 112 by associating the customer profile 526 with a token level 528 based on the task 524 that the customer 112 wants to perform using the client device, and more specifically on a mobile application on the client device. Associating can be done via a mapping of the customer profile 526 to the token level 528.

The token level 528 refers to a parameter, variable, data structure, or a combination thereof, that signifies a security level or state of security associated with the task 524. In one embodiment, the token level 528 can be categorized in a hierarchical manner such as from a "high" to "low" token level 528 based on the task 524, where a "low" token level 528 signifies a low security level or state associated with the task 524 and a "high" token level 528 signifies a high security level or state associated with the task 524. By way of example, in one embodiment, if the customer 112 wants to, for example, check the balance of an account or deposit money into an account, the token level 528 associated with that task 524 can be, for example, "low" while if the customer 112 wants to transfer or withdraw money from an account, the token level 528 associated with that task 524 can be, for example, "high." Further, in one embodiment, in a "low" security level or state, the level of authentication needed to be performed to verify the identity of the customer 112 can be less than that needed in a "high" security level or state, such that less methods of verification, such as asking less questions, asking for less information from the customer 112, etc., is implemented by the authentication module 506 to verify the identity of the customer 112.

The token level 528 can be represented in a variety of ways, for example, in one embodiment, the token level 528 can be represented as one or more numbers, for example, "0," "1," "2," etc. where "0" signifies a low security level or state while "2" signifies a high security level or state. In another embodiment, the token level 528 can be represented using words or characters, for example "low," "medium," "high," etc., as examples, where "low" signifies a low security level or state while "high" signifies a high security level or state. In one embodiment, the token level 528 can be pre-determined.

Continuing with the example, in one embodiment, once the authentication module 506 associates the customer profile 526 with the token level 528 based on the task 524, the authentication module 506 can enable the generation of one or more authentication instructions 414 based on the token level 528 and the customer profile 526. For example, in one embodiment, the authentication module 506 can enable the generation of one or more authentication instructions 414, for example, one or more passcodes, words, phrases, questions, images, biometric factors, usernames and passwords, access keys, or a combination thereof used to verify the identity of the customer 112. In one embodiment, the authentication module 506 can determine the number of authentication instructions 414 to generate based on the token level 528. For example, in one embodiment, the higher the token level 528 the more authentication instructions 414 will be generated to verify the identity of the customer 112.

In one embodiment, the authentication module 506 can further determine the number of authentication instructions 414 generated based on pre-existing information known by the computing system 100. For example, in one embodiment, if the customer 112 has pre-authenticated him or herself, by for example, inserting a physical bank issued card into a client device, for example the third device 108, and has entered a pin associated with the card via the third device 108 prior to the occurrence of the error event 518, for example the card capture error event 520, the authentication module 506 can determine that no or fewer authentication instructions 414 need to be generated to verify the identity of the customer 112 despite, for example the customer 112 conducting transactions categorized as a high security level or state transactions, because the computing system 100 has already pre-authenticated or verified the identity of the customer 112 based on the information provided by the customer 112. In one embodiment, the pre-existing information can be known to the authentication module 506 based on information obtained by parsing the log file 522.

In one embodiment, the generation of the authentication instructions 414 can further be based on information from the customer profile 526. For example, the one or more passcodes, words, phrases, questions, images, biometric factors, usernames and passwords, access keys, or a combination thereof used to verify the identity of the customer 112 can be based on information from the customer profile 526, such as the customer 112 social security number, account information, username and password, address, driver's license information, biometric information, including a retina map, fingerprint, facial map, voice, or a combination thereof. For example, in one embodiment, the authentication instructions 414 can include questions regarding the customer's 112 last four digits of his or her social security number, address, driver's license information, an access code sent to the customer 112, or the authentication instructions 414 can include verification using biometric information such as verifying a retina scan, fingerprint, facial map, voice, or a combination thereof.

In one embodiment, once the authentication module 506 enables the association of the customer profile 526 to the token level 528 and further enables the generation of the authentication instructions 414, the authentication module 506 can pass control and the authentication instructions 414 to the contact module 508 for further processing.

The contact module 508 can enable the transmission of the authentication instructions 414 to a client device, for example the first device 102. The contact module 508 can enable the transmission via a notification 530. The notification 530 refers to a method of communication to the client device. For example, the notification 530 can include, for example, a text message, an email, a phone call, a push notification, a haptic feedback, or a combination thereof to the client device, for example the first device 102. The transmission can be done via a communication unit, for example the second communication unit 226 of FIG. 2 and the communication path 104.

In one embodiment, the contact module 508 can further enable the receipt of the customer input variable 416 from the client device. For example, the contact module 508 can receive the customer input variable 416, for example a fingerprint scan, a username and password, or other verifying information based on the authentication instructions 414 being sent to the customer 112 requesting authentication based on a fingerprint or a username and password. In another embodiment, the contact module 508 can receive the customer input variable 416, for example an authentication code, based on the authentication instructions 414 being sent to the customer 112 requesting authentication based on an authentication code sent to the customer 112. In another embodiment, the contact module 508 can receive more than one customer input variable 416 based on multiple authentication instructions 414 being transmitted to the customer 112, where more than one customer input variable 416 needs to be provided by the customer 112. The receipt can be done via a communication unit, for example the second communication unit 226 via the communication path 104.

In one embodiment, the contact module 508 can further enable the generation of a match indicator 532 based on comparing the authentication instructions 414 to the customer input variable 416. The match indicator 532 refers to a variable, parameter, threshold, or a combination thereof that indicates whether the expected value of the authentication instructions 414 is equivalent to or the same as the customer input variable 416. The expected value of the authentication instructions can be based on an authentication parameter, wherein the authentication parameter refers to a variable, data structure, parameter, or a combination thereof obtained from the detailed information of the customer profile 526. For example, if the authentication instruction 414 is a question asking for the last four digits of the customer 112 social security number, the expected value of the authentication instruction can be obtained from the social security number in the customer profile 526. In another embodiment, if the authentication instruction 414 requests a fingerprint request, the expected value of the authentication instruction 414 can be obtained from a fingerprint associated with the customer 112 and stored in or as a part of the customer profile 526. Based on the match indicator 532, the computing system 100 can verify the identity of the customer 112 and further initiate a transaction session 534 where the customer 112 can continue the task 524 or other transactions initially started on the client device, for example the third device 108, using another client device, for example the first device 102, and more specifically using a mobile application on the client device.

For example, in one embodiment, if the authentication instructions 414 include a verification code sent to the customer 112, and the customer 112 provides, as the customer input variable 416, the same verification code sent to the customer 112, the contact module 508 can determine that there is a match between the authentication instructions 414 and the customer input variable 416 and generate the match indicator 532 indicating that the authentication instructions 414 and the customer input variable 416 are equivalent, and can verify the identity of the customer 112. In another embodiment, if the customer 112 provides a scan of a fingerprint using the client device, as the customer input variable 416, and the contact module 508 determines that the scan of the fingerprint meets a minimum threshold, for example 99% similar to a known fingerprint of the customer 112 obtained from the customer profile 526, by for example enabling or otherwise analyzing the points of similarity of the two fingerprints, the match indicator 532 can be generated indicating that the authentication instructions 414 and the customer input variable 416 are equivalent and can verify the identity of the customer 112.

The match indicator 532 can be represented in a variety of ways, including as a numerical value, parameter, threshold, or as a textual value, parameter, or threshold. In one embodiment, the match indicator 532 can be represented, for example, as a binary value, such as "0" or "1," where "0" represents no match between the authentication instructions 414 and the customer input variable 416, and "1" represents a match between the authentication instructions 414 and the customer input variable 416. In another embodiment, the match indicator 532 can be represented as a textual value of "Yes" or "No," where "Yes" represents a match between the authentication instructions 414 and the customer input variable 416 and "No" represents no match between the authentication instructions 414 and the customer input variable 416.

In one embodiment, if the contact module 508 determines there is a match between the authentication instructions 414 and the customer input variable 416, the contact module 508 can pass control to the transaction module 510. If, however, the contact module 508 determines that there is no match between the authentication instructions 414 and the customer input variable 416, the contact module 508 can pass control to the termination module 516. The termination module 516 enables the termination of communications between the client device, for example the first device 102 and the server, for example the second device 106, or termination of communications between the client device, for example the first device 102 and other client devices, for example the third device 108.

In one embodiment, if the contact module 508 passes control to the transaction module 510, the transaction module 510 can enable the initiation of the transaction session 534 between one or more client devices, for example the first device 102 and the third device 108, via the server, for example the second device 106. The transaction session 534 refers to an instance where the customer 112 is paired to a client device, such as the third device 108, and can control the client device using another client device, for example the first device 102 to continue to perform the task 524 or transactions despite the error event 518. Continue to perform the task 524 or transactions refers to the ability of the customer 112 to carry on performing the task 524 or transactions from the point at which the customer 112 was performing the task 524 or transactions prior to the occurrence of the error event 518, without having to perform additional tasks or functions, navigate to the particular tasks 524 or transactions, or input any variables or information to carry on performing the tasks 524 or transactions.

In one embodiment, the transaction session 534 can be initiated using a software application on a client device, for example a software application on the first device 102 that allows the customer 112 to control the other client device, for example the third device 108. The software application can be for example, a mobile application, a remote computer control software, a remote access software, or built into an application on a mobile device. In one embodiment, the transaction module 510 can further generate the barcode 402 to enable the initiation of the transaction session 534. For example, in one embodiment, the transaction module 510 can enable the generation of the barcode 402 and transmit the barcode 402 to a client device, for example the third device 108. The customer 112, using another client device, for example the first device 102 can scan the barcode 402, using for example the first camera interface 204 of FIGS. 2 and 3 and send the image to the transaction module 510. The transaction module 510 can then compare the scanned image of the barcode 402 and determine whether the scanned image by the customer 112 is the same as the barcode 402 transmitted to the third device 108. If the transaction module 510 determines that the scanned image is the same as the barcode 402, the transaction module 510 can further initiate the transaction session 534 and pair or otherwise connect the first device 102 and the third device 108 to initiate the transaction session 534.

In one embodiment, once the transaction session 534 is initiated, the customer 112 can continue performing the task 524 or perform further transactions using the software application on the first device 102 to control the third device 108. For example, the customer 112 can use the software application on the first device 102 to access a bank account, check the status of a bank account, withdraw money from a bank account, transfer money to and from a bank account, deposit money into a bank account, or a combination thereof, via the first device 102.

In one embodiment, where the error event 518 is a card capture error event 520, the transaction module 510 can further generate a card replacement link 536, and can further transmit the card replacement link 536 to the customer 112 during the transaction session 534. The card replacement link 536 refers to a hyperlink that forwards the customer 112 to a website, a landing page, a screen, or a combination thereof where the customer 112 has the option of requesting or ordering, from the bank, a replacement physical bank issued card, such as a debit card or a credit card. In one embodiment, the card replacement link 536 can be displayed on a client device, for example on the third device 108 using the third display interface 314, or can be sent to a client device, for example to the first device 102 via a notification 530. In one embodiment, the card replacement link 536 can be generated based on receiving a card replacement request from the mobile application during the mobile transaction session.

It has been discovered that the methods, modules, units, services, and components implementing the above described computing system 100 significantly improves the ability of the customer 112 to transact with a bank because it allows the customer 112 an alternative option to complete the task 524 or transactions with the bank despite errors or malfunctions of one or more client devices, for example an ATM. It has been further discovered that the computing system 100 significantly improves the customer 112 user experience because it allows the customer 112 an option to complete the task 524 or transactions with the bank despite errors or malfunctions of one or more client devices.

It has been further discovered that the computing system 100 significantly improves the customer 112 user experience because it allows the customer 112 to instantly pair and communicate with a bank system via a client device and without a physical bank issued card, such as a debit card or a credit card through a secure transaction session 534 to complete a task 524 or further transactions with the bank. It has been further discovered that the computing system 100 provides a novel way of verifying the customer 112 through the token levels 528 and authentication instructions 414, and pairing the customer 112 to the banking system to complete the task 524 or further transactions with the bank based on the verification.

The computing system 100 has been described with module functions or order as an example. The computing system 100 can partition the modules differently or order the modules differently. For example, the first software 220, the second software 244, the third software 324, or a combination thereof, can include the modules for the computing system 100. As a specific example, the first software 220, the second software 244, the third software 324, or a combination thereof can include the error detection module 502, the customer identification module 504, the authentication module 506, the contact module 508, the transaction module 510, and the termination module 516, and associated sub-modules included therein.

The first control unit 210, the second control unit 238, the third control unit 318, or a combination thereof, can execute the first software 220, the second software 244, the third software 324, or a combination thereof, to operate the modules. For example, the first control unit 210, the second control unit 238, the third control unit 318, or a combination thereof, can execute the first software 220, the second software 244, the third software 324, or a combination thereof, to implement the error detection module 502, the customer identification module 504, the authentication module 506, the contact module 508, the transaction module 510, and the termination module 516, and associated sub-modules included therein.

The modules described in this application can be implemented as instructions stored on a non-transitory computer readable medium to be executed by the first control unit 210, the second control unit 238, the third control unit 318, or a combination thereof. The non-transitory computer readable medium can include the first storage unit 216, the second storage unit 240, the third storage unit 320, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 6:
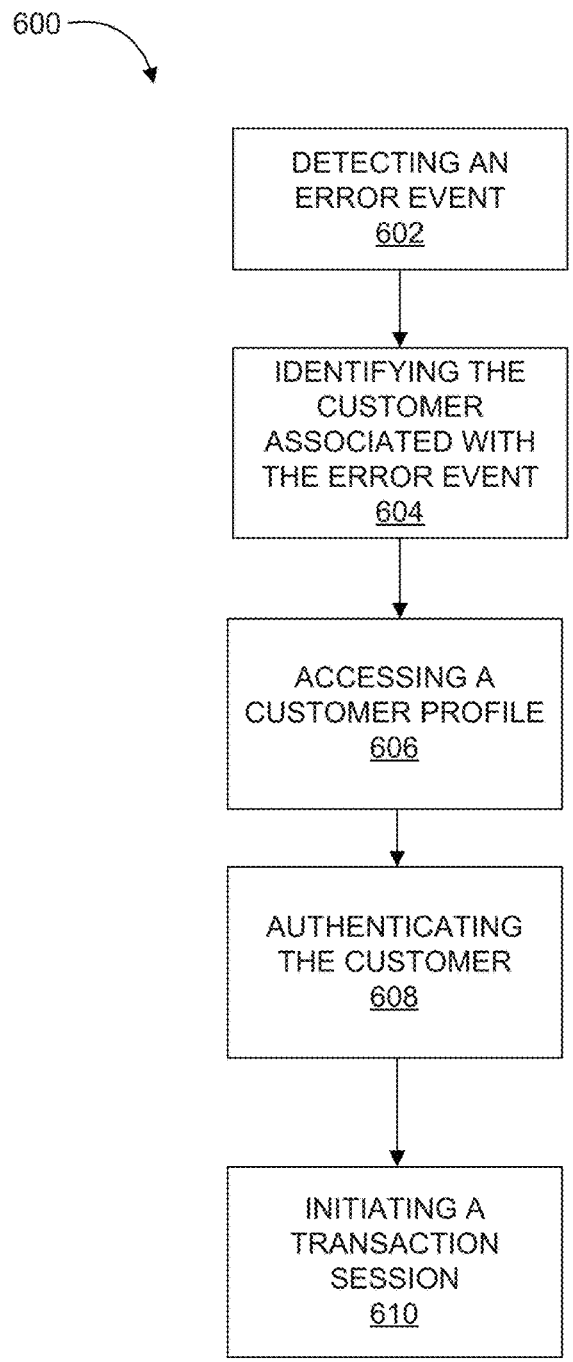
FIG. 6 is an exemplary method of operating the computing system in an embodiment of the present invention.

Referring now to FIG. 6, therein is shown an exemplary method 600 of operating the computing system 100 in an embodiment of the present invention. The method 600 includes: detecting, based on a log file of an automated teller machine (ATM), an error event as shown in box 602; identifying a customer associated with the error event based on the log file as shown in box 604; accessing, from a customer identification database, a customer profile associated with the customer as shown in box 606; authenticating the customer on a mobile application, based on the customer profile as shown in box 608; and initiating a mobile transaction session based on authenticating the customer, wherein the customer can complete a transaction with the ATM via the mobile application during the mobile transaction session as shown in box 610.

The above detailed description and embodiments of the disclosed computing system 100 are not intended to be exhaustive or to limit the disclosed computing system 100 to the precise form disclosed above. While specific examples for the computing system 100 are described above for illustrative purposes, various equivalent modifications are possible within the scope of the disclosed computing system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method, process, apparatus, device, product, and system is cost-effective, highly versatile, and accurate, and can be implemented by adapting components for ready, efficient, and economical manufacturing, application, and utilization. Another important aspect of an embodiment of the present invention is that it valuably supports and services the historical trend of reducing costs, simplifying systems, and increasing performance.

These and other valuable aspects of the embodiments of the present invention consequently further the state of the technology to at least the next level. While the disclosed embodiments have been described as the best mode of implementing the computing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operating a computing system comprising:
   detecting, based on a log file of an automated teller machine (ATM), an error event;
   identifying a customer associated with the error event based on the log file;
   accessing, from a customer identification database, a customer profile associated with the customer;
   authenticating the customer on a mobile application, based on the customer profile; and
   initiating a mobile transaction session based on authenticating the customer, wherein the customer can complete a transaction with the ATM via the mobile application during the mobile transaction session.

2. The method as claimed in claim 1, wherein authenticating the customer comprises:
   generating, based on a security level needed to execute the transaction, an authentication instruction used to verify the identity of the customer,
   transmitting, to the mobile application, the authentication instruction,
   receiving, from the mobile application, a customer input variable input in response to the authentication instruction, wherein the customer input variable is used to verify the identity of the customer,
   determining that the customer input variable matches an authentication parameter designated in the customer profile as a correct response to the authentication instruction; and
   wherein
   initiating the mobile transaction session is based on determining that the customer input variable matches the authentication parameter.

3. The method as claimed in claim 1, further comprising identifying the transaction based on the log file, wherein the transaction is initiated prior to the error event.

4. The method as claimed in claim 1, wherein the transaction is initiated via the mobile application during the mobile transaction session.

5. The method as claimed in claim 1, further comprising receiving a card replacement request from the mobile application during the mobile transaction session.

6. The method as claimed in claim 1, wherein the error event includes a mechanical error event.

7. The method as claimed in claim 1, wherein the error event includes a software error event.

8. The method as claimed in claim 1, wherein the error event includes a card capture error event.

9. The method as claimed in claim 1, wherein initiating the mobile transaction session is further based on receiving an identifier for the ATM from the mobile application, wherein the identifier is encoded in a QR code displayed on a display of the ATM.

10. A non-transitory computer readable medium including instructions for operating a computing system comprising:
    detecting, based on a log file of an automated teller machine (ATM), an error event;
    identifying a customer associated with the error event based on the log file;
    accessing, from a customer identification database, a customer profile associated with the customer;
    authenticating the customer on a mobile application, based on the customer profile; and
    initiating a mobile transaction session based on authenticating the customer, wherein the customer can complete a transaction with the ATM via the mobile application during the mobile transaction session.

11. The non-transitory computer readable medium as claimed in claim 10 with instructions wherein authenticating the customer comprises:
    generating, based on a security level needed to execute the transaction, an authentication instruction used to verify the identity of the customer,
    transmitting, to the mobile application, the authentication instruction,
    receiving, from the mobile application, a customer input variable input in response to the authentication instruction, wherein the customer input variable is used to verify the identity of the customer,
    determining that the customer input variable matches an authentication parameter designated in the customer profile as a correct response to the authentication instruction; and
    wherein
    initiating the mobile transaction session is based on determining that the customer input variable matches the authentication parameter.

12. The non-transitory computer readable medium as claimed in claim 10 with instructions further comprising identifying the transaction based on the log file, wherein the transaction is initiated prior to the error event.

13. The non-transitory computer readable medium as claimed in claim 10 wherein the transaction is initiated via the mobile application during the mobile transaction session.

14. The non-transitory computer readable medium as claimed in claim 10 with instructions further comprising receiving a card replacement request from the mobile application during the mobile transaction session.

15. The non-transitory computer readable medium as claimed in claim 10 with instructions wherein the error event includes a mechanical error event.

16. The non-transitory computer readable medium as claimed in claim 10 with instructions wherein the error event includes a software error event.

17. The non-transitory computer readable medium as claimed in claim 10 with instructions wherein the error event includes a card capture error event.

18. The non-transitory computer readable medium as claimed in claim 10 with instructions wherein initiating the mobile transaction session is further based on receiving an identifier for the ATM from the mobile application, wherein the identifier is encoded in a QR code displayed on a display of the ATM.

19. A computing system comprising:
    a control unit configured to:
       detect, based on a log file of an automated teller machine (ATM), an error event,
       identify a customer associated with the error event based on the log file,
       authenticate the customer on a mobile application, based on a customer profile associated with the customer, and
       initiate a mobile transaction session based on authenticating the customer, wherein the customer can complete a transaction with the ATM via the mobile application during the mobile transaction session; and
    a communication unit, coupled to the control unit, configured to access, from a customer identification database, the customer profile.

20. The system as claimed in claim 19 wherein:
the control unit is further configured to:
  generate, based on a security level needed to execute the transaction, an authentication instruction used to verify the identity of the customer,
  determine that a customer input variable used to verify the identity of the customer matches an authentication parameter designated in the customer profile as a correct response to the authentication instruction, and
  initiate the mobile transaction session based on determining that the customer input variable matches the authentication parameter; and
the communication unit is further configured to:
  transmit, to the mobile application, the authentication instruction; and
  receive, from the mobile application, the customer input variable input in response to the authentication instruction.

21. The system as claimed in claim 19, wherein the control unit is further configured to identify the transaction based on the log file, wherein the transaction is initiated prior to the error event.

22. The system as claimed in claim 19, wherein the control unit is further configured to initiate the transaction via the mobile application during the mobile transaction session.

23. The system as claimed in claim 19, wherein the communication unit is further configured to receive a card replacement request from the mobile application during the mobile transaction session.

24. The system as claimed in claim 19, wherein the error event includes a mechanical error event.

25. The system as claimed in claim 19, wherein the error event includes a software error event.

26. The system as claimed in claim 19, wherein the error event includes a card capture error event.

27. The system as claimed in claim 19, wherein:
the control unit is further configured to initiate the mobile transaction session based on an identifier for the ATM, wherein the identifier is encoded in a QR code displayed on a display of the ATM; and
the communication unit is further configured to receive the identifier from the mobile application.

* * * * *